US012691784B2

(12) United States Patent
Chen et al.

(10) Patent No.: US 12,691,784 B2
(45) Date of Patent: Jul. 28, 2026

(54) SYSTEM FOR MONITORING ENERGY CAPABILITY OF AN ELECTRIC AIRCRAFT AND OUTPUTTING WARNING MESSAGES

(71) Applicant: Honeywell International Inc., Charlotte, NC (US)

(72) Inventors: Shuai Chen, Shanghai (CN); Jinkun Liu, Shanghai (CN); Alan Bruce Hickman, Phoenix, AZ (US); Xueqian Song, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 138 days.

(21) Appl. No.: 18/339,318

(22) Filed: Jun. 22, 2023

(65) Prior Publication Data

US 2024/0424944 A1 Dec. 26, 2024

(51) Int. Cl.
B60L 58/10 (2019.01)
B60L 3/12 (2006.01)
(Continued)

(52) U.S. Cl.
CPC ................. B60L 58/10 (2019.02); B60L 3/12 (2013.01); B64D 31/00 (2013.01); G05D 1/1062 (2019.05);
(Continued)

(58) Field of Classification Search
CPC .. B60L 3/12; B64D 31/09; B64D 3/00; G01R 31/396; B64U 50/32
See application file for complete search history.

(56) References Cited

U.S. PATENT DOCUMENTS 9,761,066 B2 9/2017 Chen et al.
10,328,805 B1 6/2019 Wyrobek et al.
(Continued)

FOREIGN PATENT DOCUMENTS

EP 3936376 A1 1/2022
FR 2909461 A1 * 6/2008 ........... G05D 1/0661
(Continued)

OTHER PUBLICATIONS

Extended Search Report from counterpart European Application No. 24178725.8 dated Nov. 15, 2024, 9 pp.
(Continued)

*Primary Examiner* — Yuri Kan
(74) *Attorney, Agent, or Firm* — Shumaker & Sieffert, P.A.

(57) ABSTRACT
A system may monitor energy consumption of an aircraft. The system may include a memory and processing circuitry in communication with the memory. The processing circuitry may be configured to receive aircraft status data that indicates whether one or more fault conditions are present on the aircraft; receive flight plan data corresponding to a flight plan of the aircraft; and receive battery data indicative of a status of one or more batteries, wherein the battery data includes an amount of energy stored by the one or more batteries and a power output capability of the one or more batteries. Additionally, the processing circuitry may determine, based on the aircraft status data, the flight plan data, and the battery data, whether the aircraft is capable of completing the flight plan; and output, based on determining that the aircraft is not capable of completing the flight plan, a warning message.

20 Claims, 5 Drawing Sheets

(51) Int. Cl.

| | | |
|---|---|---|
| *B64C 29/00* | (2006.01) |
| *B64D 31/00* | (2024.01) |
| *G05D 1/00* | (2024.01) |
| *H01M 10/42* | (2006.01) |
| *H01M 10/48* | (2006.01) |

(52) U.S. Cl.
CPC ....... *B60L 2200/10* (2013.01); *B64C 29/0008* (2013.01); *H01M 10/425* (2013.01); *H01M 2010/4271* (2013.01); *H01M 10/48* (2013.01)

(56) References Cited

U.S. PATENT DOCUMENTS

| | | | |
|---|---|---|---|
| 10,921,381 B2 | 2/2021 | Karner et al. | |
| 2021/0313804 A1* | 10/2021 | Wiegman ............. | G01R 31/396 |
| 2022/0185493 A1 | 6/2022 | Chen et al. | |
| 2022/0203841 A1 | 6/2022 | Prabhu et al. | |
| 2022/0291683 A1 | 9/2022 | Bacic et al. | |
| 2022/0299569 A1 | 9/2022 | Kurtz et al. | |
| 2024/0255967 A1* | 8/2024 | Takemura ............. | B64D 31/09 |

FOREIGN PATENT DOCUMENTS

| | | | | |
|---|---|---|---|---|
| JP | 2021047205 A | 3/2021 | | |
| RU | 2753818 C1 * | 8/2021 | ............. | B64C 27/22 |
| WO | 2019135271 A1 | 7/2019 | | |
| WO | WO-2020067026 A1 * | 1/2021 | ............. | B64U 50/32 |
| WO | 2023079964 A1 | 5/2023 | | |

OTHER PUBLICATIONS

Response to Extended Search Report dated Nov. 15, 2024, from counterpart European Application No. 24178725.8 filed Feb. 12, 2025, 32 pp.

* cited by examiner

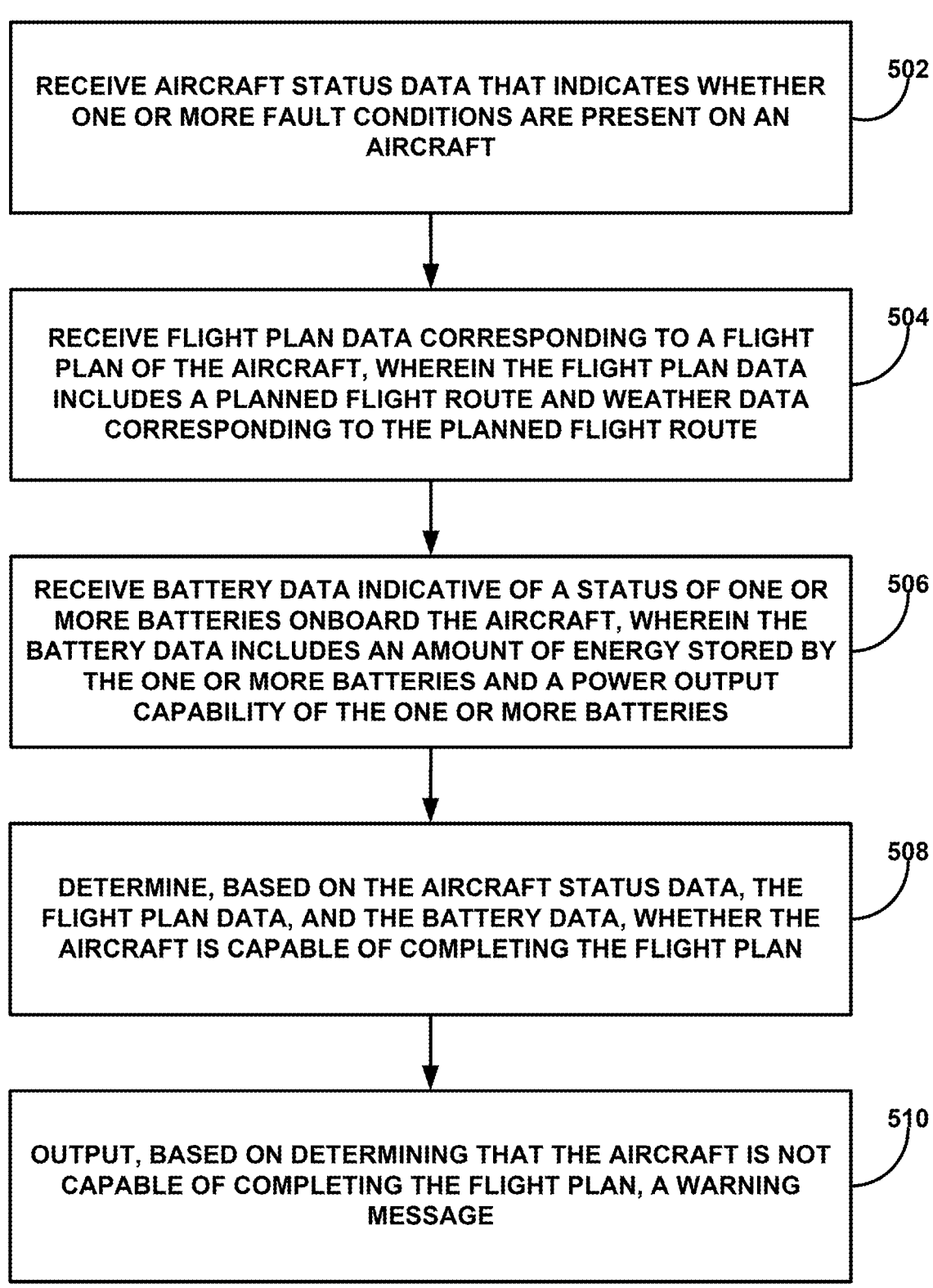

RECEIVE AIRCRAFT STATUS DATA THAT INDICATES WHETHER ONE OR MORE FAULT CONDITIONS ARE PRESENT ON AN AIRCRAFT — 502

RECEIVE FLIGHT PLAN DATA CORRESPONDING TO A FLIGHT PLAN OF THE AIRCRAFT, WHEREIN THE FLIGHT PLAN DATA INCLUDES A PLANNED FLIGHT ROUTE AND WEATHER DATA CORRESPONDING TO THE PLANNED FLIGHT ROUTE — 504

RECEIVE BATTERY DATA INDICATIVE OF A STATUS OF ONE OR MORE BATTERIES ONBOARD THE AIRCRAFT, WHEREIN THE BATTERY DATA INCLUDES AN AMOUNT OF ENERGY STORED BY THE ONE OR MORE BATTERIES AND A POWER OUTPUT CAPABILITY OF THE ONE OR MORE BATTERIES — 506

DETERMINE, BASED ON THE AIRCRAFT STATUS DATA, THE FLIGHT PLAN DATA, AND THE BATTERY DATA, WHETHER THE AIRCRAFT IS CAPABLE OF COMPLETING THE FLIGHT PLAN — 508

OUTPUT, BASED ON DETERMINING THAT THE AIRCRAFT IS NOT CAPABLE OF COMPLETING THE FLIGHT PLAN, A WARNING MESSAGE — 510

FIG. 5

SYSTEM FOR MONITORING ENERGY CAPABILITY OF AN ELECTRIC AIRCRAFT AND OUTPUTTING WARNING MESSAGES

TECHNICAL FIELD

This disclosure relates to energy consumption by electric aircraft.

BACKGROUND

An aircraft may include one or more propulsion devices that are powered by an electric power source, such as a battery. Since batteries store a finite amount of energy, an operating range and operating time of an electric aircraft is be limited by an amount of energy stored by a battery powering the propulsion devices of the aircraft. In some cases, an electric aircraft may execute a flight plan to travel from a takeoff location to a landing location. As the aircraft travels between the takeoff location and the landing location, the propulsion devices may draw power from the battery, and the amount of energy stored by the battery decreases throughout the flight.

SUMMARY

In general, this disclosure is directed to methods, techniques, devices, and systems for monitoring energy consumption of an electric aircraft to ensure that a power source of the electric aircraft is storing enough energy to complete a flight plan. For example, an electric aircraft may comprise one or more propulsion devices that draw power from an onboard electric power source, such as a battery. The battery may be configured to store a finite amount of energy, and the energy stored by the battery may decrease over time as the aircraft operates. An energy consumption monitoring system may determine whether the aircraft is capable of safely completing a flight path to a destination based on several factors. These factors may include an amount of energy stored by the battery, a power output capability of the battery, a status of one or more components of the aircraft, data corresponding to a planned flight path, or any combination thereof.

One factor that is important for evaluating whether an electric aircraft is configured to complete a flight plan is the proposed flight path associated with the flight plan. For example, an amount of energy that an electric aircraft consumes to complete a longer flight path may be greater as compared with an amount of energy that the aircraft consumes to complete a shorter flight path. The energy consumption monitoring system may compare an amount of energy required for the aircraft to traverse the planned flight path with the amount of energy currently stored by the battery to determine whether the electric aircraft is able to complete the flight plan.

Weather is another factor that affects energy consumption of electric aircrafts. In some examples, inclement weather may cause an electric aircraft to consume additional energy to travel through the inclement weather that the electric aircraft would not consume absent the presence of the inclement weather. In some examples, if an aircraft travels around inclement weather to avoid travelling through the inclement weather, this may cause the electric aircraft to consume additional energy that the electric aircraft would not consume if the inclement weather was not present. In any case, the energy consumption monitoring system may evaluate weather data to determine whether the aircraft is configured to complete a flight plan. If an aircraft adjusts a proposed flight path to avoid inclement weather, the system may evaluate the adjusted flight path to determine whether the aircraft is configured to complete a flight plan according to the adjusted flight path.

The energy consumption of an electric aircraft may depend, at least in part, on a status of one or more components of the electric aircraft. For example, the electric aircraft may consume energy most efficiently when all of the propulsion devices of the electric vehicle are operating properly. But when one or more of the propulsion devices fail or do not operate at full capability, this may affect an amount of energy drawn from the battery. For example, when one or more propulsion devices fail or operate at decreased capacity, this may cause the electric aircraft to consume energy at decreased efficiency. The energy consumption monitoring system may determine whether the aircraft is configured to complete a flight plan based on determining the status of the one or more components of the electric aircraft.

A power output capability of a battery onboard an electric aircraft may affect an ability of the aircraft to complete a flight plan. The electric aircraft may, in some examples, be configured to perform a vertical takeoff and/or a vertical landing. Propulsion devices of the aircraft may draw energy from the battery at a significantly higher rate during takeoff and landing as compared with a rate that the propulsion devices draw energy during other portions of the flight. The energy consumption monitoring system may determine, based on a highest rate that the battery is expected to be able to deliver energy at the time of a landing of the flight plan, whether the aircraft is configured to complete the flight plan. This means that the energy consumption monitoring system may determine whether the battery is expected to be capable of outputting energy at a rate high enough for the aircraft to perform a vertical landing at the end of the journey, and factor this analysis into determining whether the aircraft is configured to complete the flight plan.

The techniques of this disclosure may provide one or more advantages. By determining whether an aircraft is configured to complete a flight plan based on the status of aircraft components, flight plan data, and battery data including energy capacity and power capacity, the energy consumption monitoring system may determine whether the aircraft is configured to complete the flight plan more accurately as compared with systems that do not evaluate all of these factors. For example, since the rate of energy drawn from the battery is significantly higher during vertical landing as compared with the rate of energy drawn during many other portions of a flight plan, the energy consumption monitoring system may more accurately determine whether the aircraft is capable of completing the flight plan by evaluating both the power output capability of the battery and the amount of energy stored by the battery as compared with systems that evaluate amount of energy stored without evaluating power output capability.

In some examples, a system for monitoring energy consumption of an aircraft includes a memory; and processing circuitry in communication with the memory. The processing circuitry is configured to: receive aircraft status data that indicates whether one or more fault conditions are present on the aircraft; receive flight plan data corresponding to a flight plan of the aircraft, wherein the flight plan data includes a planned flight route and weather data corresponding to the planned flight route; receive battery data indicative of a status of one or more batteries onboard the aircraft, wherein the battery data includes an amount of energy stored by the one or more batteries and a power output capability of the one or more batteries; determine, based on the aircraft status data, the flight plan data, and the battery data, whether the aircraft is capable of completing the flight plan; and output, based on determining that the aircraft is not capable of completing the flight plan, a warning message.

In some examples, a method for using processing circuitry in communication with a memory to monitor energy consumption of an aircraft, wherein the method comprises: receiving, by the processing circuitry, aircraft status data that indicates whether one or more fault conditions are present on the aircraft; receiving, by the processing circuitry, flight plan data corresponding to a flight plan of the aircraft, wherein the flight plan data includes a planned flight route and weather data corresponding to the planned flight route; receiving, by the processing circuitry, battery data indicative of a status of one or more batteries onboard the aircraft, wherein the battery data includes an amount of energy stored by the one or more batteries and a power output capability of the one or more batteries; determining, by the processing circuitry based on the aircraft status data, the flight plan data, and the battery data, whether the aircraft is capable of completing the flight plan; and outputting, by the processing circuitry based on determining that the aircraft is not capable of completing the flight plan, a warning message.

In some examples, a non-transitory computer-readable medium includes instructions for causing one or more processors to: receive aircraft status data that indicates whether one or more fault conditions are present on the aircraft; receive flight plan data corresponding to a flight plan of the aircraft, wherein the flight plan data includes a planned flight route and weather data corresponding to the planned flight route; receive battery data indicative of a status of one or more batteries onboard the aircraft, wherein the battery data includes an amount of energy stored by the one or more batteries and a power output capability of the one or more batteries; determine, based on the aircraft status data, the flight plan data, and the battery data, whether the aircraft is capable of completing the flight plan; and output, based on determining that the aircraft is not capable of completing the flight plan, a warning message.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 5 is a flow diagram illustrating a second example operation for monitoring energy consumption of an electric aircraft, in accordance with one or more techniques of this disclosure.

DETAILED DESCRIPTION

Figure 1:
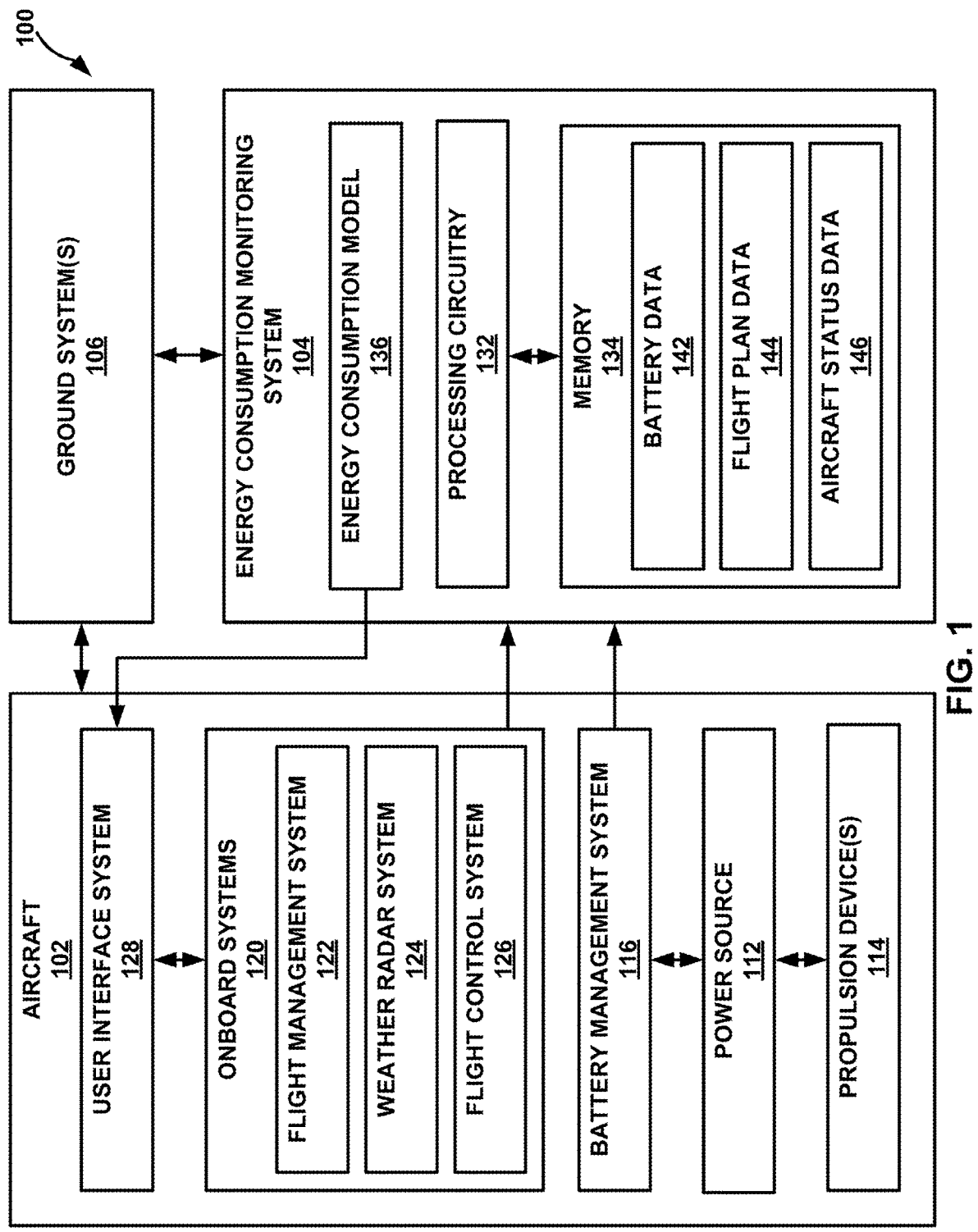
FIG. 1 is a block diagram illustrating a system for monitoring power consumption, in accordance with one or more techniques of this disclosure.

An energy consumption monitoring system may automatically monitor energy consumption aboard an aircraft to determine whether the aircraft is capable of completing a flight plan. The energy consumption monitoring system may, in response to determining that the aircraft is likely not capable of completing a flight plan, provide one or more warning messages to the aircraft and/or one or more warning messages to a ground facility. The system may predict an amount of energy and a power output required to complete the flight plan, and the system may receive information indicating an amount of energy stored by a power source of the aircraft and a highest power output that the power source is configured to deliver. Based on battery information and other information, the energy consumption monitoring system may determine whether the aircraft is configured to complete the flight plan. When the system determines that the aircraft is not capable of completing the flight plan, the system may output a message to the aircraft and/or a ground facility to take proper alternate action to ensure a safety of the flight.

In some examples, the energy consumption monitoring system may assist a pilot onboard an aircraft in ensuring that the aircraft is capable of safely completing a flight. For example, the energy consumption monitoring system may decrease a risk of consuming all the energy stored by a power source of an aircraft or exceeding a power output capability of the power source before landing as compared with systems that do not monitor energy consumption of an aircraft. The system may, in some cases, be configured to select an alternate flight plan in response to determining that an aircraft is likely not configured to complete a planned flight plan.

Electric vertical takeoff and landing vehicles (eVTOLs) may represent electric aircraft that are configured to takeoff, land, and fly using electrical energy without consuming carbon-based fuels. In some examples, an eVTOL may be configured for Urban Air Mobility (UAM). An eVTOL may, in some examples, represent an unmanned aerial vehicle (UAV), but this is not required. Some eVTOLs are operated by a human pilot aboard the aircraft. An energy capacity and a power capacity of an onboard power source may limit an operation of an eVTOL. In some examples, an energy density of a battery may affect the energy capacity and the power output of the battery. It may be even more important for a pilot of an electric aircraft to monitor energy capabilities of the electric aircraft as compared with the importance of monitoring energy capabilities of ground electric vehicles, because an electric aircraft may fail and fall to the ground if it runs out of energy during flight.

Power consumption of an electric aircraft may vary depending on flight phases and environmental conditions. For example, an electric aircraft may consume energy at a greater rate during vertical takeoff or vertical landing as compared with a rate of energy consumption consumed during conventional takeoff and conventional landing. Additional energy consumption may also result from deviating from a planned route, turbulence, waiting for an Air Traffic Controller command, among other reasons. In some examples, it may be difficult for a pilot to monitor energy consumption of an electric aircraft without the aid of an energy consumption monitoring system. Even though a battery management system can determine an amount of energy stored by the battery, this information alone may be insufficient to determine whether the flight can be completed safely. An erroneous power consumption estimation may cause a severe accident when an electric aircraft runs out of power while in the air.

FIG. 1 is a block diagram illustrating a system 100 for monitoring power consumption, in accordance with one or more techniques of this disclosure. For example, system 100 includes an aircraft 102, an energy consumption monitoring system 104 configured to monitor energy consumption of the aircraft 102, and ground system(s) 106. In some examples, energy consumption monitoring system 104 may be located entirely onboard aircraft 102. In some examples, energy consumption monitoring system 104 may be located entirely within ground system(s) 106. In some examples, energy consumption monitoring system 104 may be distributed between aircraft 102 and ground system(s) 106.

Aircraft 102 may include power source 112, propulsion device(s) 114, battery management system 116 and onboard systems 120 including flight management system 122, weather radar system 124, and flight control system 126. Aircraft 102 further includes user interface system 128. In some examples, aircraft 102 may comprise an electric aircraft configured to operate using electrical energy. In some examples, aircraft 102 comprises an eVTOL that is configured to perform vertical takeoff and vertical landing, but this is not required. Additionally, or alternatively, aircraft 102 may be configured to perform conventional takeoff and conventional landing. In some examples, aircraft 102 may comprise an electric conventional takeoff and landing vehicle (eCTOL) that is configured to perform conventional takeoff and conventional landing without being configured to perform vertical takeoff and vertical landing. In some examples, aircraft 102 may be configured to perform conventional takeoff, conventional landing, vertical takeoff, and vertical landing. In some examples, aircraft 102 may be configured to perform short conventional takeoff and short conventional landing.

Aircraft 102 may consume energy throughout the course of a flight, including during takeoff, landing, aerial movement, and aerial hovering. Energy consumption monitoring system 104 may be configured to determine whether aircraft 102 is configured to complete a flight plan based on information corresponding to aircraft 102 and the flight plan. It may be important for energy consumption monitoring system 104 to monitor data in order to determine whether aircraft 102 is capable of completing a flight plan, because if aircraft 102 depletes stored electrical energy before a flight plan is completed, this may cause aircraft 102 to fail or otherwise malfunction.

Ground system(s) 106 may include one or more systems configured to communicate with aircraft 102 and/or perform one or more tasks relating to a flight of aircraft 102. For example, ground system(s) 106 may include one or more ground aircraft communication systems (e.g., air traffic control centers). Ground system(s) 106 may include one or more systems configured to control one or more aspects of a flight of aircraft 102. Ground system(s) 106 may include one or more systems configured to provide data to aircraft 102 (e.g., systems for providing weather data).

Power source 112 is configured to deliver operating power to the components of aircraft 102. Power source 112 may include one or more batteries and one or more power generation circuits to produce the operating power. In some examples, the battery is rechargeable to allow extended operation. In some examples, battery charging circuitry (not illustrated in FIG. 1) may recharge the power source 112 when aircraft 102 is landed to increase an amount of energy stored by power source 112. While aircraft 102 is flying, components of aircraft 102 may consume energy stored by power source 112. Power source 112 may include any one or more of a plurality of different battery types, such as nickel cadmium batteries and lithium-ion batteries.

In some examples, power source 112 may be configured to store an amount of energy. The amount of energy stored by the power source 112, in some examples, may represent a total amount of work that the power source 112 is configured to perform before the energy stored by the power source 112 is depleted. In some examples, power source 112 may have a power output capability. Power is the rate at which work is performed per unit time. For example, the highest rate at which power source 112 is configured to output energy is the power output capability of power source 112.

Propulsion device(s) 114 may represent one or more devices configured to cause aircraft 102 to move aerially. In some examples, propulsion device(s) 114 may include one or more propellers. In some examples, propulsion device(s) 114 may include one or more rotors. A propeller may represent a mechanical blade that is configured to rotate to propel the aircraft 102 in a substantially horizontal direction. A rotor may represent a mechanical blade that is configured to rotate to provide lift to cause aircraft 102 to gain altitude, to keep aircraft 102 airborne, to propel aircraft 102 in a direction, or otherwise support a flight of aircraft 102. Each propeller of the one or more propellors may be connected to circuitry that draws power from power source 112 in order to cause the propeller to rotate. Each rotor of the one or more rotors may be connected to circuitry that draws power from power source 112 in order to cause the rotor to rotate. Propulsion device(s) 114 may include one or more other devices that consume electric energy to support a flight of aircraft 102.

Battery management system 116 may be configured to determine information relating to one or more energy capabilities of power source 112. For example, battery management system 116 may be configured to determine an amount of energy stored by power source 112. In some examples, the amount of energy stored by power source 112 may be compared with a predicted energy consumption required to complete a flight plan in order to determine whether aircraft 102 is configured to complete the flight plan. In some examples, battery management system 116 may be configured to determine battery data corresponding to power source 112 including a temperature of power source 112, an age of power source 112, an energy distribution in a battery pack of power source 112, a health status of power source 112, or any combination thereof. Battery temperature, battery age, thermal management status, energy distribution, and health status may impact a power output capability of power source 112. That is, a rate at which power source 112 can deliver energy per unit time may be affected by one or more factors indicated by the battery data. Information determined by battery management system 116 may be referred to herein as "battery data."

Onboard systems 120 may include systems that are configured to determine inputs for predicting energy consumption required to complete a flight plan. For example, flight management system 122 may determine a flight plan to be performed by aircraft 102. In some examples, flight management system 122 may pre-load a flight plan before takeoff, and follow the flight plan during the flight. In some examples, a flight plan may include a proposed flight route. Flight plans are subject to change, and flight management system 122 may be configured to amend the flight plan during flight to account for changes to the flight plan. In some examples, flight management system 122 is configured to determine flight information such as estimated time to arrive at a destination, a distance remaining to the destination, and a flight phase for a completed portion of the flight and a remaining portion of the flight. In some examples, information determined by the flight management system 122 may be referred to herein as "flight plan data."

Weather radar system 124 may be configured to determine weather information corresponding to an area of a flight path such as turbulence, crosswind, windshear, presence of inclement weather, or any combination thereof. In some examples, weather radar system 124 performs and processes weather radar scans. For example, weather radar system 124 may include a transmitter configured to emit a transmitted radar signal and a receiver configured to detect a reflected radar signal. Weather radar system 124 may include circuitry configured to identify, based on a reflected radar signal, one or more obstacles surrounding aircraft 102, and output an indication of the obstacle(s) for display to a user, such as a pilot of aircraft 102. Weather radar system 124 may be configured to detect, based on a reflected radar signal, an instance of inclement weather within a current intended flight path of aircraft 102. Inclement weather may generally include any hazardous atmospheric disturbance, such as a storm cell, storm clouds, hail, rain, tornadoes, hurricanes, and blizzards. Additionally, or alternatively, weather radar system 124 may identify one or more areas of headwinds, crosswinds and/or turbulence based on radar data. In some examples, flight plan data may include weather data identified by weather radar system 124 corresponding to an intended flight path of aircraft 102.

In some examples, weather radar system 124 may be configured to store three-dimensional radar data in a memory of aircraft 102. In some examples, the three-dimensional radar data may include radar data corresponding to reflected radar signals. Three-dimensional weather data may include data for one or more points within a three-dimensional Cartesian space. Weather radar system 124 may update the three-dimensional radar data stored in the memory based on the most recent data arriving at aircraft 102, so that the three-dimensional radar data reflects the current state of weather. In some examples, at least some of the three-dimensional radar data may be output for display on a display screen so that users can view the data. In some examples, the three-dimensional weather information may be augmented by weather information received by aircraft 102 from ground system(s) 106, but this is not required.

In some examples in accordance with this disclosure, weather radar system 124 may be configured to determine, based on a reflected radar signal, an area of inclement weather in the travel path of the aircraft 102 and output information indicative of the inclement weather. For example, weather radar system 124 may detect upcoming inclement weather and output information indicative of characteristics of the weather, allowing flight crew to select another flight path to avoid the inclement weather. For example, weather radar system 124 may be configured to output information indicative of one or more factors relating to the inclement weather, such as, but not limited to, a speed and/or direction of motion, a current or future proximity to aircraft 102, a size and/or shape, a relative severity, and a general nature, such as whether the weather is or is expected to be discharging precipitation, snow, hail, lightning, tornadoes, or other detritus toward the ground.

In some examples, weather radar system 124 may receive information indicative of a user input of a flight path that avoids inclement weather for example, by changing a horizontal direction of travel in order to circumvent weather while maintaining a constant altitude. In some examples, the flight path may include a vertical change in altitude in order to either "jump over" or "crawl under" the inclement weather. As previously discussed, because inclement weather may be releasing one or more of rain, snow, hail, lightning, or tornadoes downward toward the ground, flight crew may more often determine that an upward climb in altitude to "jump over" the storm is preferable to a downward drop in altitude for the comfort and/or safety of the vehicle's occupants.

In any case, weather data collected by weather radar system 124 may be analyzed to determine whether aircraft 102 is configured to complete a flight plan. When a flight path is changed to avoid inclement weather, this may affect an ability of aircraft 102 to safely arrive at a destination. System 100 is configured to monitor energy consumption of aircraft 102 throughout a flight, accounting for weather data collected by weather radar system 124 and accounting for any change in flight path based on inclement weather detected by weather radar system 124.

Flight control system 126 may be configured to control one or more operational aspects of aircraft 102. In some examples, flight control system 126 may be configured to determine information indicating a status of one or more components of aircraft 102. Flight control system 126 may be configured to determine one or more fault conditions that affect a power consumption of aircraft 102. For example, flight control system 126 may determine a status of one or more propulsion device(s) 114, such as whether one or more propulsion devices are not operational or are operating at decreased capacity. Additionally, or alternatively, flight control system 126 may identify a loss of an effect or identify one or more fault conditions that cause additional power consumption. In some examples, data determined by flight control system 126 may be referred to herein as "aircraft status data."

User interface system 128 may, in some examples, include a display screen configured to output a graphical or textual indication, one or more audio devices configured to output an audio alert, one or more user controls configured to receive user input, or any combination thereof. In some examples, the display screen of user interface system may comprise a touch screen configured to display information and receive user input. The display screen may be configured to display graphical information and/or text information. In some examples, the display screen may be configured to display at least a portion of the three-dimensional weather information stored by the memory of aircraft 102.

Energy consumption monitoring system 104 may be configured to monitor whether aircraft 102 is configured to complete a flight plan based on information available to energy consumption monitoring system 104. Since aircraft 102 is configured to maintain flight and propel itself based on propulsion device(s) 114 drawing electrical energy from power source 112, it may be beneficial for energy consumption monitoring system 104 to monitor a status of power source 112 to identify whether power source 112 is capable of delivering energy required to complete a flight plan. If energy consumption monitoring system 104 determines that aircraft 102 is not capable of completing a flight plan, energy consumption monitoring system 104 may output an alert indicating that the aircraft 102 may not be configured to complete the flight plan. Energy consumption monitoring system 104 may, in some examples, be located on aircraft 102, but this is not required. In some examples, energy consumption monitoring system 104 may be located at least partially within ground system(s) 106.

Processing circuitry 132, in some examples, may include one or more processors that are configured to implement functionality and/or process instructions for execution within energy consumption monitoring system 104. For example, processing circuitry 132 may be capable of processing instructions stored in memory 134. Processing circuitry 132 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 132 may include any suitable structure, whether in hardware, software, firmware, or any combination thereof, to perform the functions ascribed herein to processing circuitry 132.

Memory 134 may be configured to store information within energy consumption monitoring system 104 during operation. The memory may include a computer-readable storage medium or computer-readable storage device. In some examples, the memory includes one or both of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 132.

Energy consumption monitoring system 104 may, in some examples, receive battery data 142 from battery management system 116. Battery data 142 may include information corresponding to an amount of energy stored by power source 112 and/or a power output capability of power source 112. In some cases, energy consumption monitoring system 104 may receive flight plan data 144 from flight management system 122 and weather radar system 124. In some examples, flight plan data 144 includes a planned flight route and weather data corresponding to the planned flight route. In some examples, the weather data includes at least some of the three-dimensional weather data stored in the memory of aircraft 102. Energy consumption monitoring system 104 may additionally or alternatively receive weather data from ground system(s) 106. Energy consumption monitoring system may receive aircraft status data 146 from flight control system 126 of aircraft 102. Aircraft status data 146 may indicate whether one or more fault conditions are present on aircraft 102. Memory 134 of energy consumption monitoring system 104 may be configured to store battery data 142, flight plan data 144, and aircraft status data 146.

In some examples, processing circuitry 132 may execute energy consumption model 136 in order to determine, based on the battery data 142, the flight plan data 144, and the aircraft status data 146, whether aircraft 102 is configured to complete the flight plan. Whether aircraft 102 is configured to complete the flight plan may depend on several factors, including a total amount of energy stored by power source 112, a power output capacity of power source 112, a proposed flight path for aircraft 102, weather data corresponding to the flight path, one or more fault conditions present on aircraft 102, or any combination thereof. Energy consumption model 136 may evaluate battery data 142, the flight plan data 144, and the aircraft status data 146 to determine whether aircraft 102 is configured to complete the flight plan, taking into consideration at least some of the several factors.

In some examples, the amount of energy stored by the power source 112 represents a capacity of the power source 112 to cause propulsion device(s) 114 of aircraft 102 to perform work. In some examples, propulsion device(s) 114 may include one or more propellors each connected to an electrical motor, and propulsion device(s) 114 may perform work by drawing electrical energy from the power source 112 to the electrical motors to spin the propellors. When the amount of energy stored by the power source 112 is depleted, the propellors may not be able to continue to operate. This means that if the total amount of energy stored by the power source 112 is depleted before the aircraft 102 completes the flight plan, the aircraft 102 may fail.

The power output capability of the power source 112 may represent a highest rate at which the power source 112 is configured to deliver energy to the propulsion device(s) 114 per unit time. In other words, the power output capability of the power source 112 may be different from the total amount of energy stored by the power source 112, because power output represents a rate of energy consumption per unit time whereas the total amount of energy is a finite amount of energy that does not consider rate per unit time.

Energy consumption model 136 may analyze both the total amount of energy stored by the power source 112 and the power output capability of power source 112 in determining whether the aircraft 102 is capable of completing the flight plan, because flight capabilities of aircraft 102 may be limited by both the total amount of energy and the power output capability. For example, a distance and/or an amount of time that aircraft 102 is capable of maintaining flight may depend on the total amount of energy stored by the power source 112. Vertical takeoff and vertical landing may require a significantly greater power output from power source 112 as compared with maintaining flight after takeoff. This means that it may be important for energy consumption model 136 to consider a power output capability of power source 112 to determine whether aircraft 102 is capable of performing a vertical landing at the end of the flight plan. In some examples, energy consumption model 136 may determine a highest rate at which the power source 112 is expected to be configured to cause the propulsion device(s) to perform work per unit time at the landing of the flight plan and compare this rate with the power output capability of the power source 112.

In some examples, aircraft 102 is configured to perform vertical takeoff, vertical landing, conventional takeoff, conventional landing, or any combination thereof. In some examples, the term "vertical takeoff" may refer to a takeoff in which aircraft 102 commences flight from a stationary position on the ground, and without first gaining momentum by horizontally travelling down a runway. The term "vertical landing" may refer to a landing where aircraft 102 descends to a stationary position on the ground without decreasing momentum by vertically traveling down a runway. A "conventional takeoff" may refer to a takeoff in which aircraft 102 gains momentum by accelerating horizontally along a runway, where fixed wings cause aircraft 102 to lifts off the ground after aircraft 102 gains sufficient horizontal momentum. A "conventional landing" may refer to a landing in which aircraft 102 gradually descends and makes contact with the ground while aircraft 102 maintains horizontal momentum, and where aircraft 102 decelerates horizontally while traveling horizontally along the runway.

Propulsion device(s) 114 may draw energy from power source 112 at a first rate during a vertical takeoff, and propulsion device(s) 114 may draw energy from power source 112 at a second rate during a conventional takeoff, where the first rate is greater than the second rate. In some examples, propulsion device(s) 114 may draw energy from power source 112 at a third rate during a vertical landing, and propulsion device(s) 114 may draw energy from power source 112 at a fourth rate during a conventional takeoff, where the third rate is greater than the fourth rate. Since vertical takeoff and vertical landing require higher rates of power consumption as compared with conventional takeoffs and conventional landings, respectively, energy consumption model 136 may determine whether it is likely that power source 112 can achieve the power output necessary for performing a vertical landing at the end of a flight plan.

In some examples a planned landing of the flight plan for aircraft 102 comprises a vertical landing. To successfully perform the vertical landing, power source 112 is configured to cause propulsion device(s) 114 of the aircraft to perform work at a rate of work per unit time. In other words, a power output capability of power source 112 must exceed a power output capability threshold for aircraft 102 to successfully complete the vertical landing. In some examples, to determine whether aircraft 102 is capable of completing the flight plan, energy consumption model 136 is configured to determine a landing probability that the highest rate at which power source 112 is expected to be configured to cause propulsion device(s) 114 to perform work per unit time at the landing of the flight plan is greater than or equal to the power output capability threshold. In some examples, whether aircraft 102 is capable of completing the flight plan is based on the probability that the highest rate at which power source 112 is expected to be configured to cause the propulsion device(s) 114 to perform work per unit time at the landing of the flight plan is greater than or equal to power output capability threshold.

The rate of work per unit time necessary for aircraft 102 to complete a vertical landing may be a first rate of work per unit time, and the aircraft may be further configured to perform a conventional landing as an alternative to a vertical landing. For the aircraft 102 to perform the conventional landing, power source 112 may be configured to cause the propulsion device(s) 114 of the aircraft 102 to perform work at a second rate of work per unit time that is lower than the first rate of work per unit time. In some examples, the landing probability that aircraft 102 is capable of completing a vertical landing is a first landing probability. Energy consumption monitoring system 104 may determine a second landing probability that a highest rate at which power source 112 is expected to be configured to cause the propulsion device(s) 114 to perform work per unit time at during a conventional landing is greater than or equal to the second rate of work per unit time. Energy consumption model 136 may compare the first landing probability to a landing probability threshold and compare the second landing probability to the landing probability threshold. Energy consumption model 136 may output, based on the first landing probability being lower than the landing probability threshold and the second landing probability being greater than the landing probability threshold, a warning message to indicate that aircraft 102 is more likely to complete the flight plan via the conventional landing as compared with the vertical landing.

Energy consumption model 136 may determine, based on receiving the flight plan data 144 including a planned flight route and the weather data corresponding to the planned flight route, that inclement weather is present along the planned flight route. Energy consumption model 136 may determine whether aircraft 102 is capable of completing the flight plan based on determining that inclement weather is present along the planned flight route. In some examples, aircraft 102 may consume energy at a greater rate while flying through inclement weather as compared to a rate that aircraft 102 consumes energy while flying through clear weather or mild weather. In some examples, when aircraft 102 alters its flight path in order to avoid inclement weather, this may increase an amount of energy required to arrive at a destination. In any case, it may be beneficial for energy consumption model 136 to analyze a proposed flight path and weather along the proposed flight path to determine whether aircraft 102 is configured to complete a flight plan.

In some examples, the weather data of flight plan data 144 comprises present weather data corresponding to weather along the planned flight route of flight plan data 144 at a present time and future weather data corresponding to weather predicted to occur along the planned flight route over a period of time following the present time. To determine that inclement weather is present along the planned flight route, energy consumption model 136 is configured to determine, based on the present weather data, that inclement weather is currently present along the planned flight route or determine, based on the future weather data, that inclement weather is predicted to be present at one or more points along the planned flight route at a time that the aircraft is expected to be located at the one or more points along the planned flight route. Energy consumption model 136 is configured to determine whether aircraft 102 is capable of completing the flight plan based on determining that inclement weather is currently present along the planned flight route or based on determining that inclement weather is predicted to be present at the one or more points along the planned flight route at the time that aircraft 102 is expected to be located at the one or more points along the planned flight route.

Aircraft status data 146 may indicate one or more fault conditions present in aircraft 102. In some examples, to determine whether aircraft 102 is capable of completing the flight plan, the energy consumption model 136 is configured to determine, based on receiving the aircraft status data indicating the one or more fault conditions, aircraft status information indicating that the one or more fault conditions negatively affect whether aircraft 102 is capable of completing the flight plan. In some examples, the energy consumption model 136 is configured to determine whether aircraft 102 is capable of completing the flight plan based on the aircraft status information. In some examples, to determine the aircraft status information, the energy consumption model 136 is configured to determine that the one or more fault conditions comprise one or more failed mechanical components or one or more mechanical components operating at decreased performance. For example, the one or more fault conditions comprise one or more failed propulsion devices of propulsion device(s) 114 of the aircraft 102 or one or more propulsion devices of propulsion device(s) 114 operating at decreased performance.

In some examples, energy consumption model 136 is configured to output a warning message based on determining that aircraft 102 is not capable of completing the flight plan. In some examples, energy consumption model 136 may output the warning device to the user interface system

128 of aircraft 102 to cause the user interface system 128 to output the message to warn pilot(s) of the aircraft 102. In some examples, user interface system 128 may output an audio message. In some examples, user interface system 128 may output the warning message for display by a display screen. Energy consumption model 136 may eschew outputting a warning message based on determining that aircraft 102 is capable of completing the flight plan.

Figure 2:
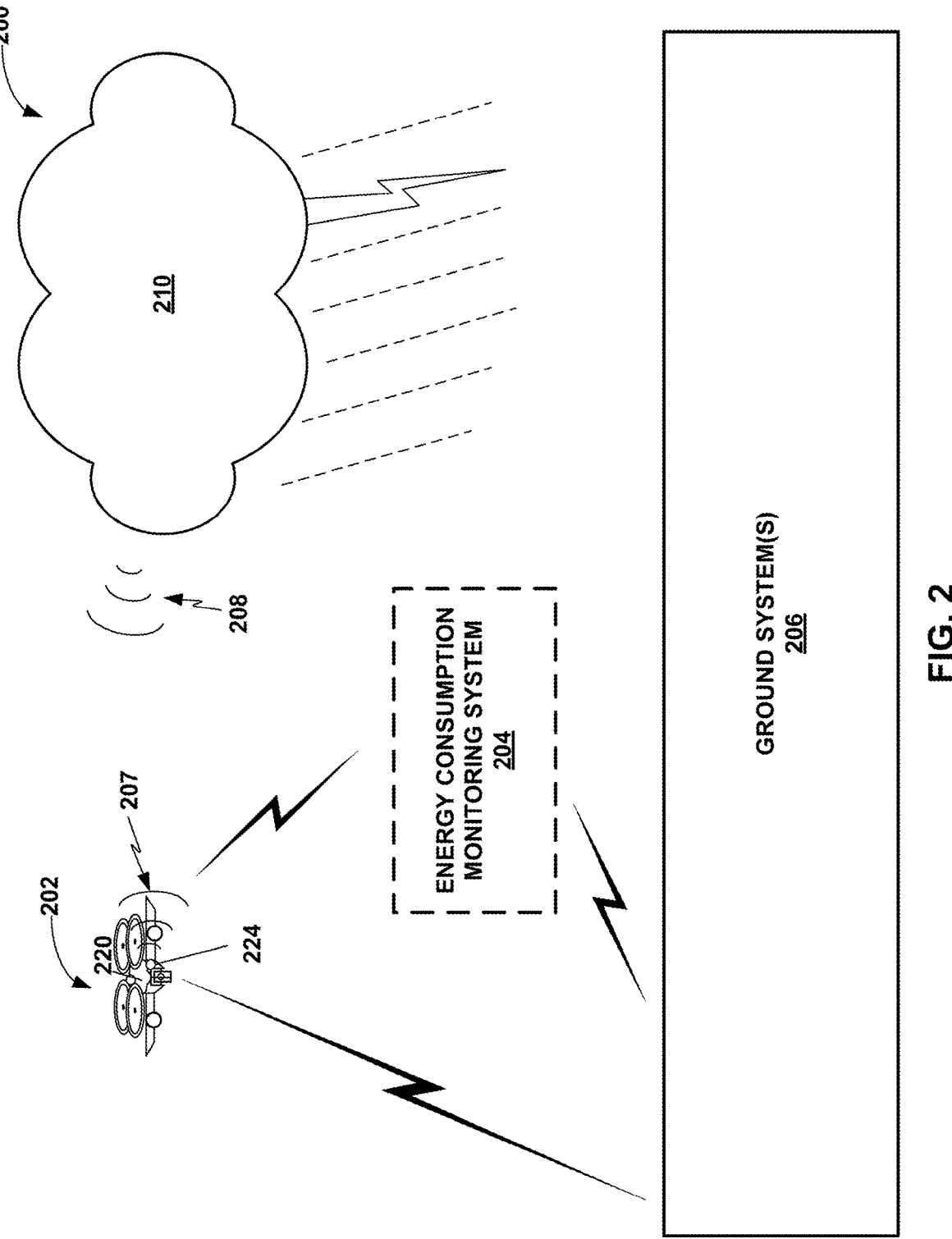
FIG. 2 illustrates a conceptual diagram of a system including a vehicle configured to complete a flight plan, in accordance with one or more techniques of this disclosure.

FIG. 2 illustrates a conceptual diagram of a system 200 including an aircraft 202 configured to complete a flight plan, in accordance with one or more techniques of this disclosure. As seen in FIG. 2, system 200 includes an aircraft 202, energy consumption monitoring system 204, and ground system(s) 206. In some examples, energy consumption monitoring system 204 is fully or partially onboard aircraft 202. In some examples, energy consumption monitoring system 204 is fully or partially within ground system (s) 206. In some examples, part of energy consumption monitoring system 204 is located on aircraft 202 and part of energy consumption monitoring system 204 is located within ground system(s) 206. Aircraft 202 includes one or more onboard systems 220 including a weather radar system 224. Aircraft 202 may include one or more other onboard systems not illustrated in FIG. 2.

In some examples, aircraft 202 is an example of aircraft 102 of FIG. 1. In some examples, energy consumption monitoring system 204 is an example of energy consumption monitoring system 104 of FIG. 1. In some examples, ground system(s) 206 is an example of ground system(s) 106 of FIG. 1.

Aircraft 202 may, in some examples, be configured to perform a vertical takeoff, a vertical landing, a conventional takeoff, a conventional landing, or any combination thereof. In some examples, aircraft 202 comprises an eVTOL. That is, aircraft 202 may include one or more propulsion devices that sustain a flight of aircraft 202 by drawing electrical energy from an electrical power source such as one or more batteries. In some examples, aircraft 202 may be configured to carry one or more human beings onboard. In some examples, a human pilot may fly aircraft 202, but this is not required. In some examples, aircraft 202 may complete a flight plan without input from one or more humans onboard aircraft 202. In some examples, aircraft 202 comprises a UAV that does not carry human pilots or passengers.

In this example, aircraft 202 includes weather radar system 224. Weather radar system 224 performs and processes weather radar scans. For example, weather radar system 224 may include a transmitter configured to emit a transmitted radar signal 207 and a receiver configured to detect a reflected radar signal 208. Onboard weather radar system 224 may be configured to identify, based on reflected radar signal 208, one or more obstacles surrounding aircraft 202, and output an indication of the obstacle(s) for display to a user, such as a pilot of aircraft 202. For example, weather radar system 224 may be configured to detect, based on reflected radar signal 208, an instance of inclement weather 210 within a current intended flight path of aircraft 202. For example, inclement weather 210 may generally include any hazardous atmospheric disturbance, such as a storm cell, storm clouds, hail, rain, tornadoes, hurricanes, and blizzards. Onboard weather radar system 224 may identify one or more areas of potential headwinds and/or turbulence based on radar data corresponding to inclement weather 210.

In some examples in accordance with this disclosure, weather radar system 224 may be configured to determine, based on reflected radar signal 208, an area of inclement weather in the travel path of the vehicle and output information indicative of the inclement weather. For example, weather radar system 224 may detect upcoming inclement weather 210 and output information indicative of characteristics of the weather 210, allowing flight crew to select another flight path to avoid the inclement weather 210. For example, weather radar system 224 may be configured to output information indicative of one or more factors relating to the inclement weather 210, such as, but not limited to, a speed and/or direction of motion, a current or future proximity to aircraft 202, a size and/or shape, a relative severity, and a general nature, such as whether the weather is or is expected to be discharging precipitation, snow, hail, lightning, tornadoes, or other detritus toward the ground.

In some examples, energy consumption monitoring system 204 may determine whether aircraft 202 is configured to complete a flight plan based on data collected by weather radar system 224. For example, aircraft 202 may draw more energy from a power source when flying through inclement weather as compared with an amount of energy that aircraft 202 consumes when flying through clear weather or mild weather. If a flight path of aircraft 202 is changed to avoid inclement weather 210, aircraft 202 may consume energy in addition to energy that it would have consumed if it did not alter the flight path. In any case, energy consumption monitoring system 204 may determine whether aircraft 102 is configured to complete a flight plan based on weather data collected by weather radar system 224 that indicates inclement weather 210.

Figure 3:
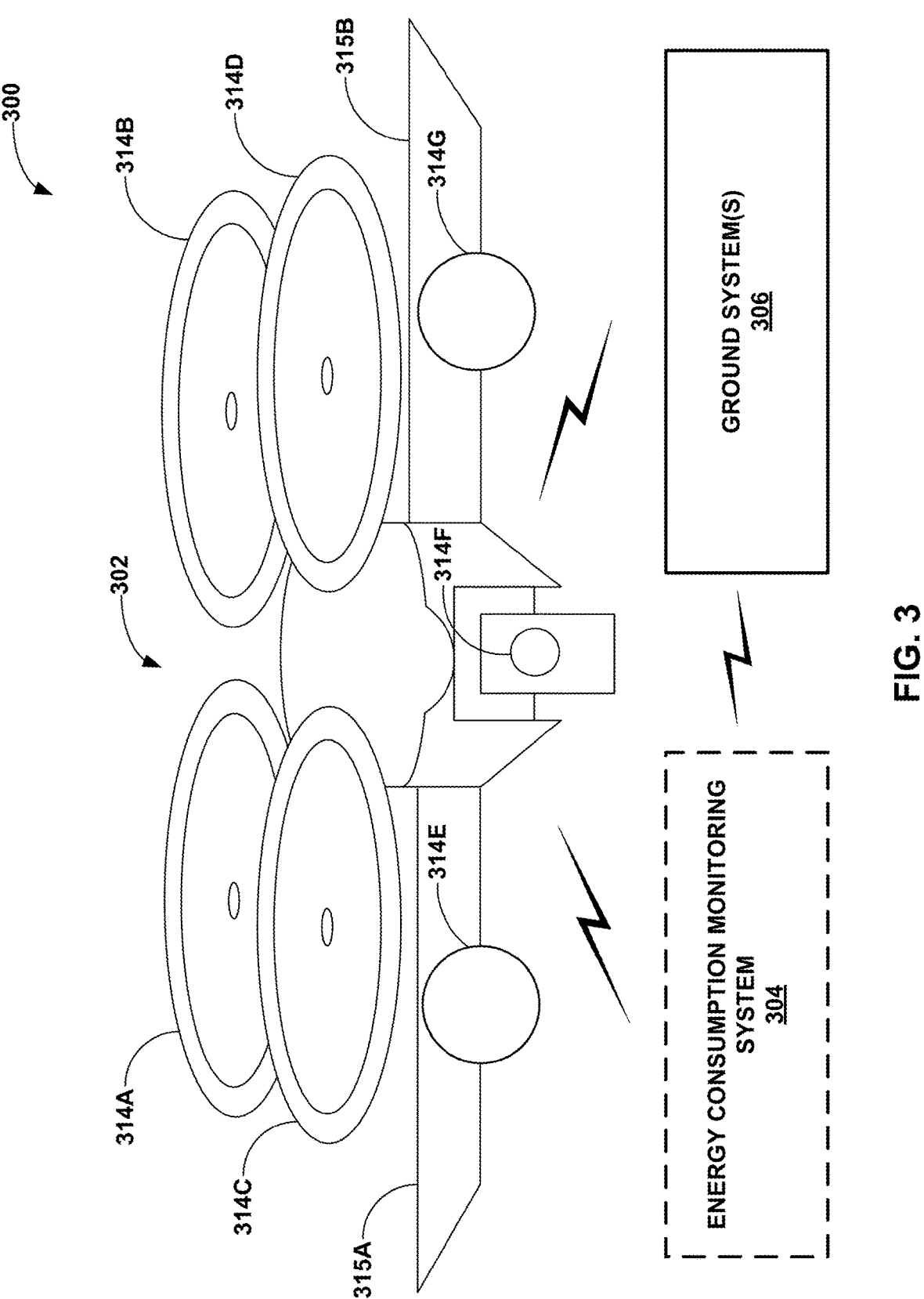
FIG. 3 is a conceptual diagram illustrating a system 300 including an example electric vertical takeoff and landing vehicle (eVTOL), in accordance with one or more techniques of this disclosure.

FIG. 3 is a conceptual diagram illustrating a system 300 including an example eVTOL, in accordance with one or more techniques of this disclosure. System 300 may include aircraft 302, energy consumption monitoring system 304, and ground system(s) 306. In some examples, aircraft 302 is an example of aircraft 102 of FIG. 1. In some examples, energy consumption monitoring system 304 is an example of energy consumption monitoring system 104 of FIG. 1. In some examples, ground system(s) 306 is an example of ground system(s) 106 of FIG. 1.

As seen in FIG. 3, aircraft 302 includes vertical propulsion devices 314A, 314B, 314C, and 314D, horizontal propulsion devices 314E, 314F, and 314G (collectively, "propulsion devices 314"). Aircraft 302 further includes fixed wings 315A and 315B. Aircraft 302 may comprise an eVTOL. In some examples, aircraft 302 is configured to carry one or more humans. In some examples, a human is configured to pilot aircraft 302. In some examples, aircraft 302 may fly without assistance from a human onboard aircraft 302.

In some examples, vertical propulsion devices 314A, 314B, 314C, and 314D and horizontal propulsion devices 314E, 314F, and 314G may, in some cases, each comprise a propeller configured to spin about an axis. In some examples, each of propulsion devices 314 may be connected to one or more electrical motors configured to draw energy from an electrical power source of aircraft 302 to cause the respective propulsion device of propulsion devices 314 to spin. In some examples, the one or more electrical motors corresponding to each propulsion device of propulsion devices 314 may control a rate (e.g., rotations per minute (RPM)) that the respective propulsion device of propulsion devices 314 spins. In some examples, it may require a greater amount of energy to sustain a propulsion device at a higher rate of rotation for a period of time as compared with the amount of energy required to sustain a propulsion device at a lower rate of rotation for the period of time. That is an electrical motor may draw energy at a greater rate to sustain a propulsion device at a higher RPM as compared with the rate at which the electrical motor draws energy to sustain the propulsion device at a lower RPM.

Aircraft 302 may be configured to perform conventional takeoff, conventional landing, vertical takeoff, vertical landing, or any combination thereof. In some examples, Aircraft 302 may be configured to perform conventional takeoff by accelerating horizontally down a runway and lifting off the runway. In some examples, horizontal propulsion devices 314E, 314F, and 314G may spin, causing horizontal momentum along the runway. When aircraft 302 attains sufficient speed on the runway, Bernoulli's principle may cause there to be a pressure differential between a top of fixed wings 315A and 315B and a bottom of fixed wings 315A and 315B, causing aircraft 302 to lift off the runway.

In some examples, aircraft 302 may be configured to perform a conventional landing by gradually descending towards a runway. Fixed wings 315A and 315B may allow aircraft 302 to gradually descend, as aircraft 302 travels horizontally while gradually descending vertically. Aircraft 302 may make contact with the runway while aircraft 302 still has horizontal momentum. Aircraft 302 may complete the conventional landing by travelling horizontally along the runway as momentum decreases, until the aircraft reaches a complete stop. In some examples, vertical propulsion devices 314A, 314B, 314C, and 314D might not assist in vertical takeoff and vertical landing. In some examples, vertical propulsion devices 314A, 314B, 314C, and 314D assist in helping aircraft 302 gain momentum down the runway. For example, vertical propulsion devices 314A, 314B, 314C, and 314D may be configured to tilt at an angle relative to the ground such that propulsion devices 314A, 314B, 314C, and 314D create horizontal as well as vertical propulsion. In some examples, vertical propulsion devices 314A, 314B, 314C, and 314D may create vertical propulsion to help lift aircraft 302 off the runway.

Aircraft 302 may be configured to perform a vertical takeoff by lifting off the ground from a stationary position on the ground. That is, aircraft 302 may be configured to lift off without first gaining horizontal momentum along a runway. For example, vertical propulsion devices 314A, 314B, 314C, and 314D may rotate at a rate that creates a vertical lift sufficient to lift aircraft 302 off the ground vertically from a stationary position on the ground. In some examples, vertical propulsion devices 314A, 314B, 314C, and 314D may create lift for a vertical takeoff without assistance from horizontal propulsion devices 314E, 314F, and 314G.

Aircraft 302 may be configured to perform a vertical landing by descending horizontally to immediately achieve a stationary position on the ground without decreasing momentum on a runway. For example, vertical propulsion devices 314A, 314B, 314C may cause aircraft 302 to gradually decrease altitude vertically without aircraft 302 also travelling horizontally. Aircraft 302 may land without having any horizontal momentum. This may allow aircraft 302 to land without a runway. Since vertical landing zones require a smaller amount of space as compared with conventional runways, it may be beneficial for aircraft 302 to perform vertical takeoff and/or vertical landing when a runway is not available.

Although it may be beneficial to perform vertical takeoff and vertical landing in some cases, aircraft 302 may draw electrical energy at a greater rate when performing vertical takeoff and vertical landing as compared with the rate at which aircraft 302 draws electrical energy when performing conventional takeoff and conventional landing. For example, since fixed wings 315A and 315B allow aircraft 302 to glide horizontally, and since aircraft 302 decreases momentum on the ground during a conventional landing, aircraft 302 may draw energy at a lower rate during a conventional landing as compared with the rate at which aircraft 302 draws energy during a vertical landing. This is because when aircraft 302 is airborne, aircraft 302 has potential energy. If aircraft 302 were to fail and crash on the ground, a portion of the potential energy that aircraft 302 has while airborne would be absorbed by the ground during the crash. To successfully land, aircraft 302 must counter the potential energy that it has while airborne. A conventional landing requires a lower rate of energy to safely land aircraft 302 as compared with a vertical landing, because part of the potential energy of aircraft 302 is countered by decelerating on the runway during a conventional landing, whereas during a vertical landing, vertical propulsion devices 314A, 314B, 314C, and 314D must draw energy at a high rate to prevent aircraft 302 from falling to the ground and crashing.

When aircraft 302 is airborne, horizontal propulsion devices 314E, 314F, and 314G may propel aircraft 302 horizontally and fixed wings 315A and 315B may create lift according to Bernoulli's principle when aircraft 302 attains a high enough rate of horizontal speed. Additionally, or alternatively, vertical propulsion devices 314A, 314B, 314C, and 314D may propel aircraft 302 horizontally. For example, when aircraft 302 tilts such that vertical propulsion devices 314A, 314B, 314C, and 314D are at an angle with the ground, vertical propulsion devices 314A. 314B, 314C, and 314D may both maintain aircraft 302 in an airborne position and cause aircraft 302 to travel horizontally. Vertical propulsion devices 314A, 314B, 314C, and 314D may, in some examples, be configured to tilt relative to aircraft 302. This may allow vertical propulsion devices 314A, 314B. 314C, and 314D to shift to occupy an angle relative to aircraft 302 and the ground.

When aircraft 302 is flying horizontally with the aid of fixed wings 315A and 315B creating lift according to Bernoulli's principle (e.g., a "fixed wing cruise"), aircraft 302 may consume energy at a lower rate as compared with portions of a flight plan where aircraft 302 relies on vertical propulsion devices 314A. 314B, 314C, and 314D for propulsion or to maintain flight without the aid of fixed wings 315A and 315B. Since aircraft 302 relies on vertical propulsion devices 314A, 314B, 314C, and 314D without the aid of fixed wings 315A and 315B during vertical takeoff and vertical landing, aircraft 30 may consume energy at a higher rate during vertical takeoff and vertical landing as compared with a rate at which aircraft 30 consumes energy during fixed wing cruise. Since aircraft 302 also relies on vertical propulsion devices 314A, 314B, 314C, and 314D without the aid of fixed wings 315A and 315B when aircraft 302 hovers and when aircraft 302 propels itself without support from fixed wings 315A and 315B, aircraft 302 may consume energy at a higher rate when aircraft 302 is hovering or flying without the aid of fixed wings 315A and 315B as compared with a rate that aircraft 302 consumes energy when it is flying with the aid of fixed wings 315A and 315B.

Since propulsion devices 314 are configured to draw electrical energy in order to complete a flight plan of aircraft 302, energy consumption monitoring system 304 may be configured to evaluate a flight plan in order to determine whether a power source of aircraft 302 is configured to supply energy sufficient to complete the flight plan. In some examples, the flight plan may include a vertical landing. The energy consumption monitoring system 304 may determine whether the power source of aircraft 302 is configured to supply electrical energy at a rate that is great enough to perform a vertical landing. If energy consumption monitoring system 304 determines that the power source of aircraft 302 is not capable of supplying electrical energy at a rate that is great enough to perform a vertical landing, energy consumption monitoring system 304 may output a warning message. The warning message may, in some examples, include an instruction to perform a conventional landing instead of a vertical landing, perform a vertical landing at a closer landing location, perform a conventional landing at a closer location, or perform an emergency landing at a closest available location. In some examples, the warning message may include an annunciation (e.g., an audio alert), but this is not required. The warning message can include any kind of message.

In some examples, to determine whether a power source of aircraft 302 is configured to supply energy sufficient to complete the flight plan, energy consumption monitoring system 304 may be configured to evaluate a distance of a proposed flight path. Aircraft 302 may draw a greater amount of energy to travel a longer distance as compared with the amount of energy that aircraft 302 draws to travel a shorter distance. If energy consumption monitoring system 304 determines that the power source of aircraft 302 cannot supply enough energy to complete the proposed flight path, energy consumption monitoring system 304 may output a warning message to alter the flight path and land at a closer location.

Energy consumption monitoring system 304 may monitor a status of propulsion devices 314 in order to determine that aircraft 302 is capable of completing a flight plan. For example, when one or more of propulsion devices 314 has failed or is operating at decreased capacity, this may affect an amount of energy that aircraft 302 draws from the power source and/or a rate at which aircraft 302 draws from the power source to maintain flight and/or land. For example, if vertical propulsion device 314B fails or is operating at decreased capacity, this may increase the rate that the power source must deliver energy to complete a vertical landing as compared with the rate that the power source must deliver energy to complete a vertical landing when each of vertical propulsion devices 314A, 314B, 314C, and 314D are operating at full capacity. Since the status of each of propulsion devices 314 may affect the power consumption of aircraft 302, energy consumption monitoring system 304 may be configured to monitor the status of each of propulsion devices 314 in real time throughout a flight of aircraft 302 to determine that aircraft 302 is configured to complete a flight plan.

Aircraft 302 is not limited to having four vertical propulsion devices 314A, 314B, 314C, and 314D and three horizontal propulsion devices 314E, 314F, and 314G. Aircraft 302 may be configured to have more than four vertical propulsion devices, less than four vertical propulsion devices, more than three horizontal propulsion devices, less than three horizontal propulsion devices, or any combination thereof. Aircraft 302 is not limited to having two fixed wings 315A and 315A. Aircraft 302 may include less than two fixed wings or more than two fixed wings. The techniques described herein are not limited to an eVTOL that is capable of conventional takeoff and landing and vertical takeoff and landing. Energy consumption monitoring system 304 may apply the techniques described herein to monitor the energy consumption of any electric aircraft.

Figure 4:
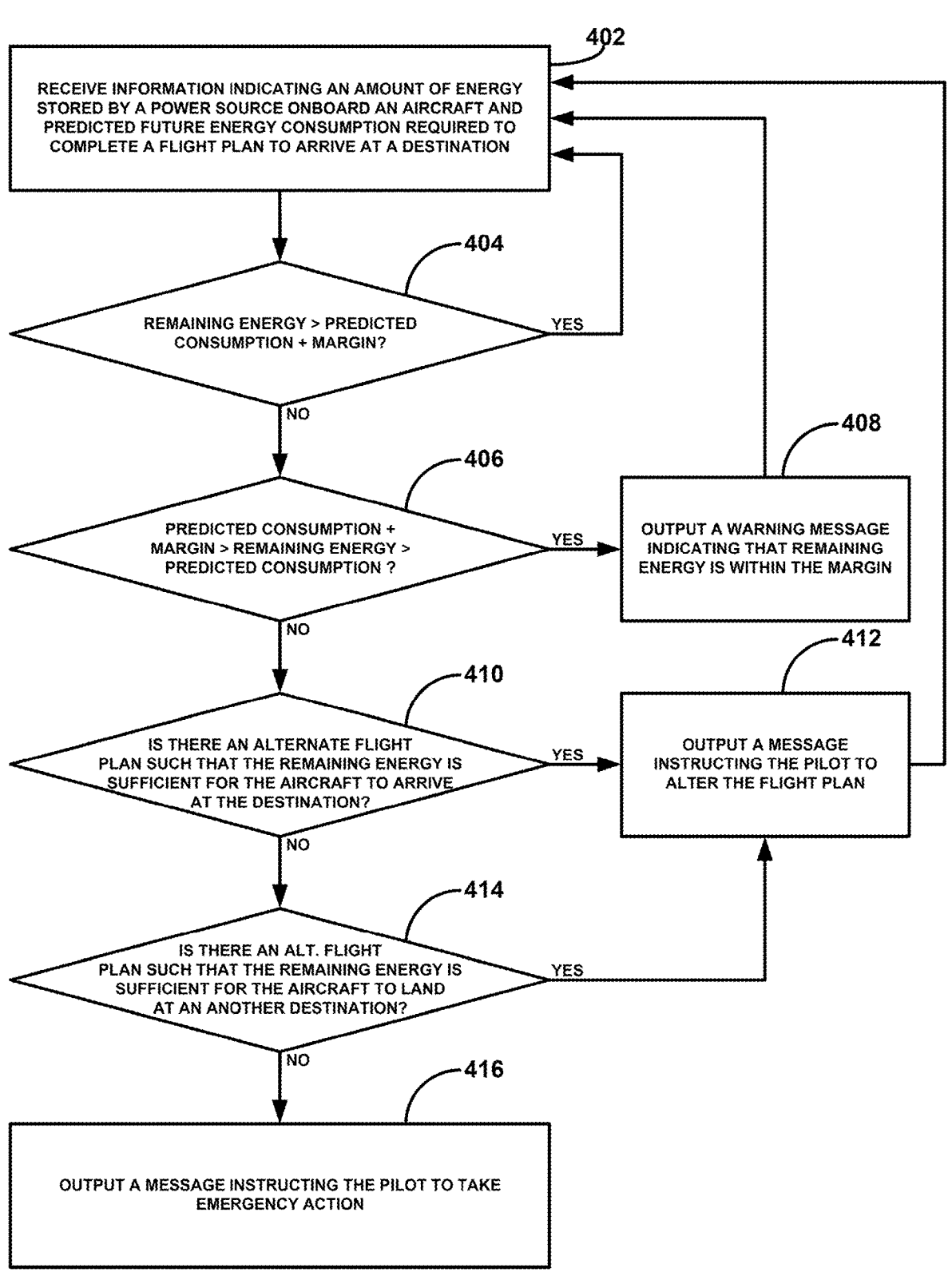
FIG. 4 is a flow diagram illustrating a first example operation for monitoring energy consumption of an electric aircraft, in accordance with one or more techniques of this disclosure.

FIG. 4 is a flow diagram illustrating a first example operation for monitoring energy consumption of an electric aircraft, in accordance with one or more techniques of this disclosure. For convenience, FIG. 4 is described with respect to system 100 of FIG. 1. However, the techniques of FIG. 4 may be performed by different components of system 100 or by additional or alternative devices.

In some examples, energy consumption monitoring system 104 may receive information indicating an amount of energy stored by power source 112 of aircraft 102 and a predicted future energy consumption required to complete a flight plan to arrive at a destination (402). In some examples, power source 112 may comprise one or more batteries. In some examples, energy consumption monitoring system 104 may collect battery data 142 corresponding to power source 112. The battery data may indicate an amount of energy stored by power source 112 and a highest power output (e.g., rate of energy) that power source is currently capable of delivering. In some examples, the battery data may indicate a highest power output that power source 112 is expected to be capable of delivering at a planned landing of the flight path. Energy consumption monitoring system 104 may determine the predicted future energy consumption required to complete the flight plan based on the battery data 142, flight plan data 144 corresponding indicating a proposed flight path and weather information corresponding to the proposed flight path, and aircraft status data 146 indicating whether one or more fault conditions are present on aircraft 102.

Energy consumption monitoring system 104 may determine whether a remaining amount of energy stored by power source 112 is greater than a predicted amount of energy consumption to complete the flight plan plus a margin (404). In some examples, when energy consumption monitoring system 104 determines that a remaining amount of energy stored by power source 112 is greater than a predicted amount of energy consumption to complete the flight plan plus a margin, energy consumption monitoring system 104 determines that aircraft 102 is configured to complete a flight plan. In some examples, when energy consumption monitoring system 104 determines that a remaining amount of energy stored by power source 112 is not greater than a predicted amount of energy consumption to complete the flight plan plus a margin, energy consumption monitoring system 104 determines that aircraft 102 is not capable of completing a flight plan.

When energy consumption monitoring system 104 determines that a remaining amount of energy stored by power source 112 is greater than a predicted amount of energy consumption to complete the flight plan plus a margin (YES at block 404), the flow may return to block 402 and energy consumption monitoring system 104 may continue to receive information indicating an amount of energy stored by power source 112 of aircraft 102. When energy consumption monitoring system 104 determines that a remaining amount of energy stored by power source 112 is not greater than a predicted amount of energy consumption to complete the flight plan plus a margin (NO at block 404), energy consumption monitoring system 104 may determine whether the remaining amount of energy stored by power source 112 is greater than predicted amount of energy consumption to complete the flight plan, but is less than the predicted amount of energy consumption to complete the flight plan plus the margin (406).

When energy consumption monitoring system 104 determines that the remaining amount of energy stored by power source 112 is greater than predicted amount of energy consumption to complete the flight plan, but is less than the predicted amount of energy consumption to complete the flight plan plus the margin (YES at block 406), energy consumption monitoring system 104 may output a warning message indicating that remaining energy is within the margin (408). When energy consumption monitoring system 104 determines that the remaining amount of energy stored by power source 112 not greater than a predicted amount of energy consumption to complete the flight plan (NO at block 406), energy consumption monitoring system 104 may determine whether an alternative flight plan exists such that the remaining amount of energy stored by power source 112 is sufficient for aircraft 102 to arrive at the same destination as of the original flight plan (410). In some examples, the alternate flight plan may include an alternate landing (e.g., a conventional landing instead of a vertical landing), an alternate flight path (e.g., avoiding inclement weather), or any combination thereof.

When energy consumption monitoring system 104 determines that an alternative flight plan exists such that the remaining amount of energy stored by power source 112 is sufficient for aircraft 102 to arrive at the same destination as of the original flight plan (YES at block 410), energy consumption monitoring system 104 may output a message instructing the pilot of aircraft 102 to perform the alternate flight plan (412). When energy consumption monitoring system 104 determines that an alternative flight plan does not exist such that the remaining amount of energy stored by power source 112 is sufficient for aircraft 102 to arrive at the same destination as of the original flight plan (NO at block 410), energy consumption monitoring system 104 may determine whether an alternative flight plan exists such that the remaining amount of energy stored by power source 112 is sufficient for the aircraft 102 to land at a destination other than the destination of the original flight plan (414).

When energy consumption monitoring system 104 determines that an alternative flight plan exists such that the remaining amount of energy stored by power source 112 is sufficient for the aircraft 102 to land at a destination other than the destination of the original flight plan (YES at block 414), energy consumption monitoring system 104 may output a message instructing the pilot of aircraft 102 to perform the alternate flight plan (412). When energy consumption monitoring system 104 determines that an alternative flight plan does not exist such that the remaining amount of energy stored by power source 112 is sufficient for the aircraft 102 to land at a destination other than the destination of the original flight plan (NO at block 414), energy consumption monitoring system 104 may output a message instructing the pilot of aircraft 102 to take emergency action (416).

FIG. 5 is a flow diagram illustrating a second example operation for monitoring energy consumption of an electric aircraft, in accordance with one or more techniques of this disclosure. For convenience, FIG. 5 is described with respect to system 100 of FIG. 1. However, the techniques of FIG. 5 may be performed by different components of system 100 or by additional or alternative devices.

Energy consumption monitoring system 104 may receive aircraft status data 146 that indicate whether one or more fault conditions are present on aircraft 102 (502). In some examples, the aircraft status data 146 may indicate a status of one or more components of aircraft 102, such as a status of one or more propulsion devices. Energy consumption monitoring system 104 may receive flight plan data 144 corresponding to a flight plan of the aircraft 102, where the flight plan data includes a planned flight route and weather data corresponding to the planned flight route (504). Energy consumption monitoring system 104 may receive battery data 142 indicative of a status of one or more batteries onboard the aircraft, wherein the battery data includes an amount of energy stored by the one or more batteries and a power output capability of the one or more batteries (506).

Energy consumption monitoring system 104 may determine, based on the aircraft status data 146, the flight plan data 144, and the battery data 142, whether the aircraft 102 is capable of completing the flight plan (508). Energy consumption monitoring system 104 may output, based on determining that the aircraft 102 is not capable of completing the flight plan, a warning message (510). In some examples, the warning message may include an alternate flight plan. The alternate flight plan may include an alternate flight path and/or an alternate landing method.

The following numbered clauses may demonstrate one or more aspects of the disclosure.

Clause 1: A system for monitoring energy consumption of an aircraft, wherein the system comprises: a memory; and processing circuitry in communication with the memory. The processing circuitry is configured to: receive aircraft status data that indicates whether one or more fault conditions are present on the aircraft; receive flight plan data corresponding to a flight plan of the aircraft, wherein the flight plan data includes a planned flight route and weather data corresponding to the planned flight route; and receive battery data indicative of a status of one or more batteries onboard the aircraft, wherein the battery data includes an amount of energy stored by the one or more batteries and a power output capability of the one or more batteries. Additionally, the processing circuitry is configured to determine, based on the aircraft status data, the flight plan data, and the battery data, whether the aircraft is capable of completing the flight plan; and output, based on determining that the aircraft is not capable of completing the flight plan, a warning message.

Clause 2: The system of clause 1, wherein to determine whether the aircraft is capable of completing the flight plan, the processing circuitry is configured to: determine, based on receiving the aircraft status data indicating the one or more fault conditions, aircraft status information indicating that the one or more fault conditions negatively affect whether the aircraft is capable of completing the flight plan; and determine whether the aircraft is capable of completing the flight plan based on the aircraft status information.

Clause 3: The system of clause 2, wherein to determine the aircraft status information, the processing circuitry is configured to determine that the one or more fault conditions comprise one or more failed mechanical components or one or more mechanical components operating at decreased performance.

Clause 4: The system of clause 3, wherein the one or more fault conditions comprise one or more failed propulsion devices of the aircraft or one or more propulsion devices operating at decreased performance.

Clause 5: The system of clause 1, wherein to determine whether the aircraft is capable of completing the flight plan, the processing circuitry is configured to: determine, based on receiving the flight plan data including the planned flight route and the weather data corresponding to the planned flight route, that inclement weather is present along the planned flight route; and determine whether the aircraft is capable of completing the flight plan based on determining that inclement weather is present along the planned flight route.

Clause 6: The system of clause 5, wherein the weather data comprises present weather data corresponding to weather along the planned flight route at a present time and future weather data corresponding to weather predicted to occur along the planned flight route over a period of time following the present time, and wherein to determine that inclement weather is present along the planned flight route, the processing circuitry is configured to perform one or both of: determine, based on the present weather data, that inclement weather is currently present along the planned flight route; or determine, based on the future weather data, that inclement weather is predicted to be present at one or more points along the planned flight route at a time that the aircraft is expected to be located at the one or more points along the planned flight route. Additionally, the processing circuitry is configured to determine whether the aircraft is capable of completing the flight plan based on determining that inclement weather is currently present along the planned flight route or based on determining that inclement weather is predicted to be present at the one or more points along the planned flight route at the time that the aircraft is expected to be located at the one or more points along the planned flight route.

Clause 7: The system of clause 1, wherein the amount of energy stored by the one or more batteries represents a capacity of the one or more batteries to cause one or more propulsion devices of the aircraft to perform work, wherein the power output capability of the one or more batteries comprises a current highest rate at which the one or more batteries are configured to cause the one or more propulsion devices to perform work per unit time and a highest rate at which the one or more batteries are expected to be configured to cause the one or more propulsion devices to perform work per unit time at a landing of the flight plan, and wherein the processing circuitry is configured to determine whether the aircraft is capable of completing the flight plan based on the capacity of the one or more batteries to cause one or more propulsion devices of the aircraft to perform work, based on the current highest rate at which the one or more batteries are configured to cause the one or more propulsion devices to perform work per unit time, and based on the highest rate at which the one or more batteries are expected to be configured to cause the one or more propulsion devices to perform work per unit time at the landing of the flight plan.

Clause 8: The system of clause 7, wherein the aircraft is configured to perform a vertical landing, wherein the landing of the flight plan comprises the vertical landing, wherein for the aircraft to successfully perform the vertical landing, the one or more batteries are configured to cause the one or more propulsion devices of the aircraft to perform work at a rate of work per unit time, wherein to determine whether the aircraft is capable of completing the flight plan, the processing circuitry is configured to determine a landing probability that the highest rate at which the one or more batteries are expected to be configured to cause the one or more propulsion devices to perform work per unit time at the landing of the flight plan is greater than or equal to the rate of work per unit time, and wherein whether the aircraft is capable of completing the flight plan is based on the landing probability that the highest rate at which the one or more batteries are expected to be configured to cause the one or more propulsion devices to perform work per unit time at the landing of the flight plan is greater than or equal to the rate of work per unit time.

Clause 9: The system of clause 8, wherein the rate of work per unit time is a first rate of work per unit time, wherein the landing probability is a first landing probability, wherein the aircraft is further configured to perform a conventional landing, wherein for the aircraft to perform the conventional landing, the one or more batteries are configured to cause the one or more propulsion devices of the aircraft to perform work at a second rate of work per unit time that is lower than the first rate of work per unit time. The processing circuitry is further configured to: determine a second landing probability that the highest rate at which the one or more batteries are expected to be configured to cause the one or more propulsion devices to perform work per unit time at the landing of the flight plan is greater than or equal to the second rate of work per unit time; compare the first landing probability to a landing probability threshold; compare the second landing probability to the landing probability threshold; and output, based on the first landing probability being lower than the landing probability threshold and the second landing probability being greater than the landing probability threshold, the warning message to indicate that the aircraft is more likely to complete the flight plan via the conventional landing as compared with the vertical landing.

Clause 10: The system of clause 1, wherein the processing circuitry is further configured to: determine, based on the aircraft status data, the flight plan data, and the battery data, that the aircraft is capable of completing the flight plan; and eschew outputting the warning message based on determining that the aircraft is capable of completing the flight plan.

Clause 11: The system of clause 1, wherein to output the warning message, the processing circuitry is configured to cause one or more audio devices of the aircraft to output the warning message as an audio message.

Clause 12: The system of clause 1, wherein the aircraft comprises an electric Vertical Takeoff and Landing Vehicle (eVTOL).

Clause 13: A method for using processing circuitry in communication with a memory to monitor energy consumption of an aircraft, wherein the method comprises: receiving, by the processing circuitry, aircraft status data that indicates whether one or more fault conditions are present on the aircraft; receiving, by the processing circuitry, flight plan data corresponding to a flight plan of the aircraft, wherein the flight plan data includes a planned flight route and weather data corresponding to the planned flight route; receiving, by the processing circuitry, battery data indicative of a status of one or more batteries onboard the aircraft, wherein the battery data includes an amount of energy stored by the one or more batteries and a power output capability of the one or more batteries; determining, by the processing circuitry based on the aircraft status data, the flight plan data, and the battery data, whether the aircraft is capable of completing the flight plan; and outputting, by the processing circuitry based on determining that the aircraft is not capable of completing the flight plan, a warning message.

Clause 14: The method of clause 13, wherein determining whether the aircraft is capable of completing the flight plan comprises: determining, by the processing circuitry based on receiving the aircraft status data indicating the one or more fault conditions, aircraft status information indicating that the one or more fault conditions negatively affect whether the aircraft is capable of completing the flight plan; and determining, by the processing circuitry, whether the aircraft is capable of completing the flight plan based on the aircraft status information.

Clause 15: The method of clause 13, wherein determining whether the aircraft is capable of completing the flight plan comprises: determining, by the processing circuitry based on receiving the flight plan data including the planned flight route and the weather data corresponding to the planned flight route, that inclement weather is present along the planned flight route; and determining, by the processing circuitry, whether the aircraft is capable of completing the flight plan based on determining that inclement weather is present along the planned flight route.

Clause 16: The method of clause 15, wherein the weather data comprises present weather data corresponding to weather along the planned flight route at a present time and future weather data corresponding to weather predicted to occur along the planned flight route over a period of time following the present time, and wherein determining that inclement weather is present along the planned flight route comprises one or both of: determining, by the processing circuitry based on the present weather data, that inclement weather is currently present along the planned flight route; or determining, by the processing circuitry based on the future weather data, that inclement weather is predicted to be present at one or more points along the planned flight route at a time that the aircraft is expected to be located at the one or more points along the planned flight route. The method further comprises determining, by the processing circuitry, whether the aircraft is capable of completing the flight plan based on determining that inclement weather is currently present along the planned flight route or based on determining that inclement weather is predicted to be present at the one or more points along the planned flight route at the time that the aircraft is expected to be located at the one or more points along the planned flight route.

Clause 17: The method of clause 13, wherein the amount of energy stored by the one or more batteries represents a capacity of the one or more batteries to cause one or more propulsion devices of the aircraft to perform work, wherein the power output capability of the one or more batteries comprises a current highest rate at which the one or more batteries is configured to cause the one or more propulsion devices to perform work per unit time and a highest rate at which the one or more batteries are expected to be configured to cause the one or more propulsion devices to perform work per unit time at a landing of the flight plan, and wherein the method further comprises determining whether the aircraft is capable of completing the flight plan based on the capacity of the one or more batteries to cause one or more propulsion devices of the aircraft to perform work, based on the current highest rate at which the one or more batteries are configured to cause the one or more propulsion devices to perform work per unit time, and based on the highest rate at which the one or more batteries are expected to be configured to cause the one or more propulsion devices to perform work per unit time at the landing of the flight plan.

Clause 18: The method of clause 17, wherein the aircraft is configured to perform a vertical landing, wherein the landing of the flight plan comprises the vertical landing, wherein for the aircraft to successfully perform the vertical landing, the one or more batteries are configured to cause the one or more propulsion devices of the aircraft to perform work at a rate of work per unit time, wherein determining whether the aircraft is capable of completing the flight plan comprises determining, by the processing circuitry, a landing probability that the highest rate at which the one or more batteries are expected to be configured to cause the one or more propulsion devices to perform work per unit time at the landing of the flight plan is greater than or equal to the rate of work per unit time, and wherein whether the aircraft is capable of completing the flight plan is based on the landing probability that the highest rate at which the one or more batteries are expected to be configured to cause the one or more propulsion devices to perform work per unit time at the landing of the flight plan is greater than or equal to the rate of work per unit time.

Clause 19: The method of clause 13, further comprising: determining, by the processing circuitry based on the aircraft status data, the flight plan data, and the battery data, that the aircraft is capable of completing the flight plan; and eschewing, by the processing circuitry, outputting the warning message based on determining that the aircraft is capable of completing the flight plan.

Claim 20: A non-transitory computer-readable medium comprising instructions for causing one or more processors to: receive aircraft status data that indicates whether one or more fault conditions are present on an aircraft; receive flight plan data corresponding to a flight plan of the aircraft, wherein the flight plan data includes a planned flight route and weather data corresponding to the planned flight route; receive battery data indicative of a status of one or more batteries onboard the aircraft, wherein the battery data includes an amount of energy stored by the one or more batteries and a power output capability of the one or more batteries; determine, based on the aircraft status data, the flight plan data, and the battery data, whether the aircraft is capable of completing the flight plan; and output, based on determining that the aircraft is not capable of completing the flight plan, a warning message.

In one or more examples, the circuitry described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

Various illustrative aspects of the disclosure are described above. These and other aspects are within the scope of the following claims.

What is claimed is:

1. A system for monitoring energy consumption of an aircraft, wherein the system comprises:

a memory; and processing circuitry hardware in communication with the memory, wherein the processing circuitry hardware is configured to:

receive aircraft status data that indicates whether one or more fault conditions are present on the aircraft;

receive flight plan data corresponding to a flight plan of the aircraft, wherein the flight plan data includes a planned flight route and weather data corresponding to the planned flight route;

receive battery data indicative of a status of one or more batteries onboard the aircraft, wherein the battery data includes an amount of energy stored by the one or more batteries and a power output capability of the one or more batteries, wherein the amount of energy stored by the one or more batteries represents a capacity of the one or more batteries to cause one or more propulsion devices of the aircraft to perform work, wherein the power output capability of the one or more batteries comprises a current highest rate at which the one or more batteries are configured to cause the one or more propulsion devices to perform work per unit time and a highest rate at which the one or more batteries are expected to be configured to cause the one or more propulsion devices to perform work per unit time at a landing of the flight plan;

determine, based on the aircraft status data, the flight plan data, and the battery data, a first landing probability that for a vertical landing the highest rate at which the one or more batteries are expected to be configured to cause the one or more propulsion devices to perform work per unit time at the landing of the flight plan is greater than or equal to a first rate of work per unit time;

determine a second landing probability that for a conventional landing the highest rate at which the one or more batteries are expected to be configured to cause the one or more propulsion devices to perform work per unit time at the landing of the flight plan is greater than or equal to a second rate of work per unit time;

compare the first landing probability to a landing probability threshold;

compare the second landing probability to the landing probability threshold;

select, based on the first landing probability being lower than the landing probability threshold and the second landing probability being greater than the landing probability threshold, an alternate flight plan; and configure the aircraft to perform the conventional landing in response to the selected alternate flight plan.

2. The system of claim 1, wherein to determine whether the aircraft is capable of completing the flight plan, the processing circuitry hardware is configured to:

determine, based on receiving the aircraft status data indicating the one or more fault conditions, aircraft status information indicating that the one or more fault conditions negatively affect whether the aircraft is capable of completing the flight plan; and determine whether the aircraft is capable of completing the flight plan based on the aircraft status information.

3. The system of claim 2, wherein to determine the aircraft status information, the processing circuitry hardware is configured to determine that the one or more fault conditions comprise one or more failed mechanical components.

4. The system of claim 3, wherein the one or more fault conditions comprise one or more failed propulsion devices.

5. The system of claim 1, wherein to determine whether the aircraft is capable of completing the flight plan, the processing circuitry hardware is configured to:

determine, based on receiving the flight plan data including the planned flight route and the weather data corresponding to the planned flight route, that inclement weather is present along the planned flight route; and determine whether the aircraft is capable of completing the flight plan based on determining that inclement weather is present along the planned flight route.

6. The system of claim 5, wherein the weather data comprises present weather data corresponding to weather along the planned flight route at a present time and future weather data corresponding to weather predicted to occur along the planned flight route over a period of time following the present time, and wherein to determine that inclement weather is present along the planned flight route, the processing circuitry hardware is configured to perform one or both of:

determine, based on the present weather data, that inclement weather is currently present along the planned flight route; or determine, based on the future weather data, that inclement weather is predicted to be present at one or more points along the planned flight route at a time that the aircraft is expected to be located at the one or more points along the planned flight route, and wherein the processing circuitry hardware is configured to determine whether the aircraft is capable of completing the flight plan based on determining that inclement weather is currently present along the planned flight route or based on determining that inclement weather is predicted to be present at the one or more points along the planned flight route at the time that the aircraft is expected to be located at the one or more points along the planned flight route.

7. The system of claim 1, wherein the aircraft comprises an electric Vertical Takeoff and Landing Vehicle (eVTOL).

8. A method for using processing circuitry hardware in communication with a memory to monitor energy consumption of an aircraft, wherein the method comprises:

receiving, by the processing circuitry hardware, aircraft status data that indicates whether one or more fault conditions are present on the aircraft;

receiving, by the processing circuitry hardware, flight plan data corresponding to a flight plan of the aircraft, wherein the flight plan data includes a planned flight route and weather data corresponding to the planned flight route;

receiving, by the processing circuitry hardware, battery data indicative of a status of one or more batteries onboard the aircraft, wherein the battery data includes an amount of energy stored by the one or more batteries and a power output capability of the one or more batteries, wherein the amount of energy stored by the one or more batteries represents a capacity of the one or more batteries to cause one or more propulsion devices of the aircraft to perform work, wherein the power output capability of the one or more batteries comprises a current highest rate at which the one or more batteries are configured to cause the one or more propulsion devices to perform work per unit time and a highest rate at which the one or more batteries are expected to be configured to cause the one or more propulsion devices to perform work per unit time at a landing of the flight plan;

determining, by the processing circuitry hardware, based on the aircraft status data, the flight plan data, and the battery data, a first landing probability that for a vertical landing the highest rate at which the one or more batteries are expected to be configured to cause the one or more propulsion devices to perform work per unit time at the landing of the flight plan is greater than or equal to a first rate of work per unit time;

determining, by the processing circuitry hardware, a second landing probability that for a conventional landing the highest rate at which the one or more batteries are expected to be configured to cause the one or more propulsion devices to perform work per unit time at the landing of the flight plan is greater than or equal to a second rate of work per unit time;

comparing, by the processing circuitry hardware, the first landing probability to a landing probability threshold;

comparing, by the processing circuitry hardware, the second landing probability to the landing probability threshold;

selecting, by the processing circuitry hardware based on the first landing probability being lower than the landing probability threshold and the second landing probability being greater than the landing probability threshold, an alternate flight plan; and configuring the aircraft to perform the conventional landing in response to the selected alternate flight plan.

9. The method of claim 8, wherein determining whether the aircraft is capable of completing the flight plan comprises:

determining, by the processing circuitry hardware based on receiving the aircraft status data indicating the one or more fault conditions, aircraft status information indicating that the one or more fault conditions negatively affect whether the aircraft is capable of completing the flight plan; and determining, by the processing circuitry hardware, whether the aircraft is capable of completing the flight plan based on the aircraft status information.

10. The method of claim 8, wherein determining whether the aircraft is capable of completing the flight plan comprises:

determining, by the processing circuitry hardware based on receiving the flight plan data including the planned flight route and the weather data corresponding to the planned flight route, that inclement weather is present along the planned flight route; and determining, by the processing circuitry hardware, whether the aircraft is capable of completing the flight plan based on determining that inclement weather is present along the planned flight route.

11. The method of claim 10, wherein the weather data comprises present weather data corresponding to weather along the planned flight route at a present time and future weather data corresponding to weather predicted to occur along the planned flight route over a period of time following the present time, and wherein determining that inclement weather is present along the planned flight route comprises one or both of:

determining, by the processing circuitry hardware based on the present weather data, that inclement weather is currently present along the planned flight route; or determining, by the processing circuitry hardware based on the future weather data, that inclement weather is predicted to be present at one or more points along the planned flight route at a time that the aircraft is expected to be located at the one or more points along the planned flight route, and wherein the method further comprises determining, by the processing circuitry hardware, whether the aircraft is capable of completing the flight plan based on determining that inclement weather is currently present along the planned flight route or based on determining that inclement weather is predicted to be present at the one or more points along the planned flight route at the time that the aircraft is expected to be located at the one or more points along the planned flight route.

12. A non-transitory computer-readable medium comprising instructions for causing one or more processors to:

receive aircraft status data that indicates whether one or more fault conditions are present on an aircraft;

receive flight plan data corresponding to a flight plan of the aircraft, wherein the flight plan data includes a planned flight route and weather data corresponding to the planned flight route;

receive battery data indicative of a status of one or more batteries onboard the aircraft, wherein the battery data includes an amount of energy stored by the one or more batteries and a power output capability of the one or more batteries, wherein the amount of energy stored by the one or more batteries represents a capacity of the one or more batteries to cause one or more propulsion devices of the aircraft to perform work, wherein the power output capability of the one or more batteries comprises a current highest rate at which the one or more batteries are configured to cause the one or more propulsion devices to perform work per unit time and a highest rate at which the one or more batteries are expected to be configured to cause the one or more propulsion devices to perform work per unit time at a landing of the flight plan;

determine, based on the aircraft status data, the flight plan data, and the battery data, a first landing probability that for a vertical landing the highest rate at which the one or more batteries are expected to be configured to cause the one or more propulsion devices to perform work per unit time at the landing of the flight plan is greater than or equal to a first rate of work per unit time;

determine a second landing probability that for a conventional landing the highest rate at which the one or more batteries are expected to be configured to cause the one or more propulsion devices to perform work per unit time at the landing of the flight plan is greater than or equal to a second rate of work per unit time;

compare the first landing probability to a landing probability threshold;

compare the second landing probability to the landing probability threshold;

select, based on the first landing probability being lower than the landing probability threshold and the second landing probability being greater than the landing probability threshold, an alternate flight plan; and configure the aircraft to perform the conventional landing in response to the selected alternate flight plan.

13. The computer-readable storage medium of claim 12, wherein the aircraft comprises an electric Vertical Takeoff and Landing Vehicle (eVTOL).

14. The method of claim 8, wherein the aircraft comprises an electric Vertical Takeoff and Landing Vehicle (eVTOL).

15. The system of claim 1, wherein the processing circuitry hardware is further configured to, in response to modifying the flight plan, cause a user interface device to output an alert indicating the flight plan has been modified.

16. The system of claim 1, wherein the one or more fault conditions comprises a failed propulsion device.

17. The system of claim 1, wherein the processing circuitry hardware is further configured to transmit the modified flight plan to a ground system.

18. The method of claim 8, further comprising:

in response to modifying the flight plan, causing a user interface device to output an alert indicating the flight plan has been modified.

19. The method of claim 8, wherein the one or more fault conditions comprises a failed propulsion device.

20. The method of claim 8, further comprising:

transmitting the modified flight plan to a ground system.

\* \* \* \* \*